US012603535B2

(12) United States Patent
Hu

(10) Patent No.: US 12,603,535 B2
(45) Date of Patent: Apr. 14, 2026

(54) FLUID DRIVING APPARATUS

(71) Applicant: HANGZHOU AO KE MEI RUI TECHNOLOGY CO., LTD., Hangzhou (CN)

(72) Inventor: Meiyan Hu, Hangzhou (CN)

(73) Assignee: HANGZHOU AO KE MEI RUI TECHNOLOGY CO., LTD., Hangzhou (CN)

( * ) Notice: Subject to any disclaimer, the term of this patent is extended or adjusted under 35 U.S.C. 154(b) by 323 days.

(21) Appl. No.: 18/273,918

(22) PCT Filed: Sep. 26, 2021

(86) PCT No.: PCT/CN2021/120571
§ 371 (c)(1),
(2) Date: Jul. 24, 2023

(87) PCT Pub. No.: WO2022/156261
PCT Pub. Date: Jul. 28, 2022

(65) Prior Publication Data
US 2024/0429768 A1 Dec. 26, 2024

(30) Foreign Application Priority Data

Jan. 25, 2021 (CN) .......................... 202110099594.6

(51) Int. Cl.
*H02K 3/50* (2006.01)
*F04D 13/06* (2006.01)
*H02K 7/14* (2006.01)

(52) U.S. Cl.
CPC ............. *H02K 3/50* (2013.01); *F04D 13/064* (2013.01); *F04D 13/0693* (2013.01); *H02K 7/14* (2013.01); *H02K 2203/09* (2013.01)

(58) Field of Classification Search
CPC ............ H02K 3/522; H02K 7/14; H02K 3/50; H02K 5/225; F04D 13/064; F04D 13/0693; F04D 29/426
See application file for complete search history.

(56) References Cited

U.S. PATENT DOCUMENTS 7,950,907 B2 * 5/2011 Nagata .................. F04D 29/406
417/423.1
2012/0027629 A1 * 2/2012 Tanahashi ............... F04D 5/002
417/410.1
(Continued)

FOREIGN PATENT DOCUMENTS

CN 107542671 A 1/2018
CN 210240012 U 4/2020
(Continued)

OTHER PUBLICATIONS

JP-2014093807-A machine translation on Aug. 9, 2025.*
(Continued)

*Primary Examiner* — Leda T Pham
(74) *Attorney, Agent, or Firm* — Yue (Robert) Xu; Apex Attorneys at Law, LLP

(57) ABSTRACT

A fluid driving apparatus includes a stator assembly, a limiting member and at least one conducting member, at least part of the conducting member and the limiting member are arranged in a limited or fixed manner; the conducting member includes a first connection end and a second connection end, the first connection end is electrically connected to the stator assembly, and the second connection end may be used as a pin end when electrically connected to an external power source, so that the stator assembly and the external power source may be electrically connected by means of the conducting member; and the conducting member is partially embedded in the limiting member, and the limiting member is an injection-molded member. The (Continued)

described manner helps to lead out the energized end of the stator assembly, so that the led-out energized end may be used as a pin of an external interface.

10 Claims, 12 Drawing Sheets

(56) References Cited

U.S. PATENT DOCUMENTS

| | | | | |
|---|---|---|---|---|
| 2019/0140496 A1* | 5/2019 | Hong | ........................ | H02K 3/50 |
| 2020/0274405 A1* | 8/2020 | Csoti | ........................ | H02K 3/38 |

FOREIGN PATENT DOCUMENTS

| | | | |
|---|---|---|---|
| CN | 210397143 | U | 4/2020 |
| DE | 102011119789 | A1 | 6/2013 |
| JP | 2012031808 | A | 2/2012 |
| JP | 2014093807 | A | * 5/2014 |
| JP | 2019516336 | A | 6/2019 |
| JP | 2019135903 | A | 8/2019 |

OTHER PUBLICATIONS

The Japanese 2nd Office Action issued on Aug. 27, 2024 for JP2023-507670.

International Search Report for PCT/CN2021/120571 mailed Nov. 29, 2021, ISA/CN.

The Korean 1st Office Action issued on Dec. 10, 2024 for KR10-2023-7028031.

The European Search Report issued on Dec. 2, 2024 for EP21920639.8.

The Japanese 1st Office Action issued on Feb. 27, 2024 for JP2023-507670.

* cited by examiner

611   L1   61

613

614

612   L2

6140   614

615   616

612   617

FLUID DRIVING APPARATUS

This application is a National Phase entry of PCT Application No. PCT/CN2021/120571, filed on Sep. 26, 2021, which claims the priority to Chinese Patent Application No. 202110099594.6, titled "FLUID DRIVING APPARATUS", filed with the China National Intellectual Property Administration on Jan. 25, 2021, the entire disclosures of which are incorporated herein by reference.

FIELD

The present application relates to a fluid driving apparatus.

BACKGROUND

A fluid driving apparatus includes a stator assembly, and in order to energize the stator assembly, an energized end of the stator assembly needs to be electrically connected to an external power source. Therefore, how to electrically connect the energized end of the stator assembly with the external power source and simplify the assembly process of the fluid driving apparatus is a technical problem that needs to be considered.

SUMMARY

An object according to the present application is to provide a fluid driving apparatus, which is beneficial to electrically connecting one end of a stator assembly with an external power source and simplifying the assembly process of the fluid driving apparatus.

In order to achieve the above object, the following technical solution is provided according to an embodiment of the present application.

A fluid driving apparatus includes a stator assembly, a limiting member and a conductive member, and the conductive member and the limiting member are arranged in a limited or fixed manner, and the conductive member includes a first connecting end and a second connecting end, and the first connecting end is electrically connected to the stator assembly, and the second connecting end can be used as a pin end when electrically connected to an external power source of the fluid driving apparatus, and the conductive member enables the stator assembly to be electrically connected with the external power source of the fluid driving apparatus; and the conductive member is partially embedded in the limiting member, and the limiting member is an injection molded member.

In the technical solution provided by the present application, the fluid driving apparatus includes a stator assembly, a limiting member and at least one conductive member, and the conductive member and the limiting member are arranged in a limited or fixed manner; and the conductive member includes the first connecting end and the second connecting end, the first connecting end is electrically connected with the stator assembly, the second connecting end can be used as a pin end when electrically connected to the external power source, and the stator assembly can be electrically connected to the external power source through the conductive member, and the conductive member is partially embedded in the limiting member, and the limiting member is an injection molded member; the above solution is beneficial to lead out the second connecting end of the stator assembly, so that the second connecting end can be used as the pin of the external power source, and the conductive member is limited by the limiting member, and the structure is simple, which is beneficial to simplify the assembly process of the fluid driving apparatus.

DETAILED DESCRIPTION OF THE EMBODIMENTS

The present application is further illustrated hereinafter in conjunction with drawings and specific embodiments.

The specific embodiments of the present application are described in detail hereinafter in conjunction with the drawings. First of all, it should be noted that the azimuth terms of up, down, left, right, front, back, inside, outside, top and bottom mentioned or possibly mentioned herein are defined relative to the structure shown in the corresponding drawings, which are relative concepts, and may change accordingly according to their different positions and different use states. Therefore, these and other directional terms should not be construed as limiting terms.

A fluid drive device in the following embodiments can provide flow power for a working medium in a vehicle thermal management system, the working medium may be water or an aqueous solution, such as an aqueous solution including 50% ethylene glycol. Certainly, the working medium may be other substance.

Figure 1:
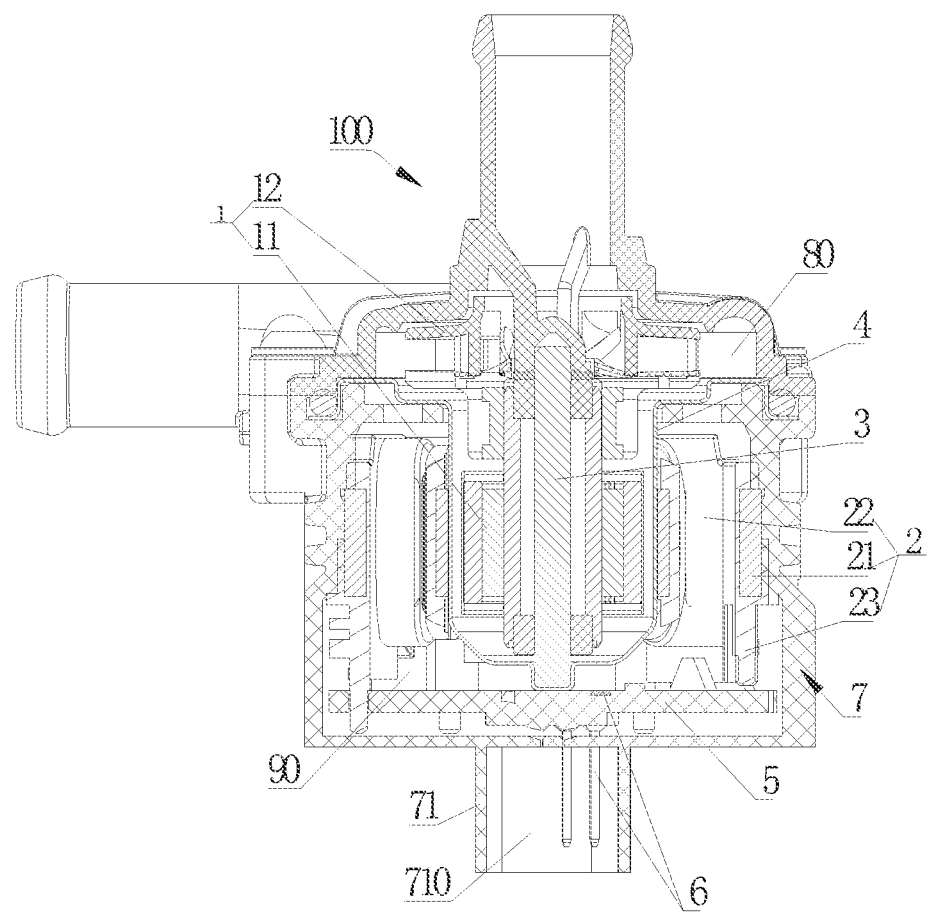
FIG. 1 is a schematic cross-sectional diagram of a first embodiment of a fluid driving apparatus of the present application.

Referring to FIG. 1, the fluid driving apparatus 100 includes a housing, a rotor assembly 1, a stator assembly 2, a shaft 3 and a partition 4, and the rotor assembly 1 is mounted outside an outer circumference of the shaft 3; the fluid driving apparatus 100 further includes an inner cavity, and the partition 4 divides the inner cavity into a first cavity 80 and a second cavity 90, the working medium can flow through the first cavity 80, and the second cavity 90 is not in direct contact with the working medium; the rotor assembly 1 is located in the first cavity 80, and the stator assembly 2 is located in the second cavity 90; referring to FIG. 1, the stator assembly 2 includes a stator iron core 21, an insulating frame 23 and a winding 22, the insulating frame 23 covers at least part of a surface of the stator iron core 21, and the winding 22 is wound around the insulating frame 23; the rotor assembly 1 includes a permanent magnet 11 and an impeller assembly 12, when the fluid driving apparatus 100 works, the excitation magnetic field generated by the stator assembly 2 is controlled by controlling the current passing through the winding 22 of the stator assembly, the rotor assembly 1 rotates around or together with the shaft 3 under the action of the excitation magnetic field.

Referring to FIG. 1, the fluid driving apparatus further includes a limiting member 5 and a conductive member 6, and the conductive member 6 and the limiting member 5 are arranged in a limited or fixed manner; the part of the limiting member 5 in contact with the conductive member 6 is non-conductive, which is beneficial to preventing, in case that the fluid driving apparatus works, the current passing through the conductive member 6 from leaking from the limiting member 5; in this embodiment, the stator assembly 2 and the limiting member 5 are arranged along an axial direction of the fluid driving apparatus, specifically, the stator assembly 2 is closer to the impeller assembly 12 than the limiting member 5, that is, the stator assembly 2 is located between the limiting member 5 and the impeller assembly 12, of course, the limiting member 5 can also be located between the stator assembly 2 and the impeller assembly 12; referring to FIG. 1, the housing includes a first housing 7, and the fluid driving apparatus further includes a plug-in portion 71, in this embodiment, the plug-in portion 71 and the first housing 7 are integrally formed. Specifically, the plug-in portion 71 protrudes from the surface of the first housing 7. In this embodiment, the opening of the plug-in portion 71 is oriented along an axial direction of the fluid driving apparatus, the plug-in portion 71, the limiting member 5 and the stator assembly 2 are arranged along the axial direction of the fluid driving apparatus, and the plug-in portion 71 has an accommodating cavity 710, a part of the conductive member 6 is located in the accommodating cavity 710, and the plug-in portion 71 is provided so that the interface of the external power source can extend into the accommodating cavity 710 and be electrically connected with the conductive member 6.

The above is introduced in detail below.

Figure 4:
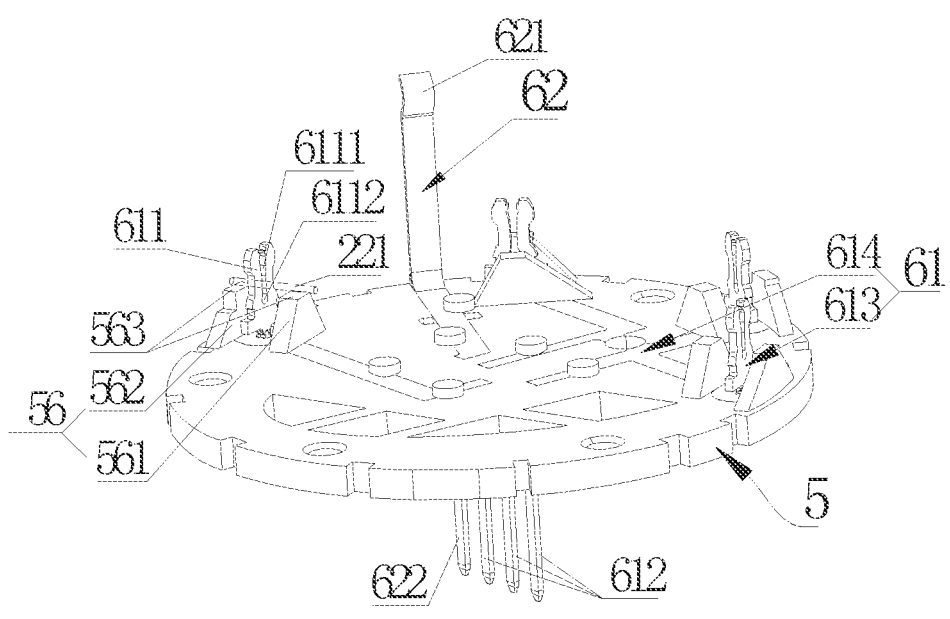
FIG. 4 is a schematic three-dimensional structure diagram of the first embodiment of the assembly of the limiting member and the conductive member in FIG. 1.
Figure 5:
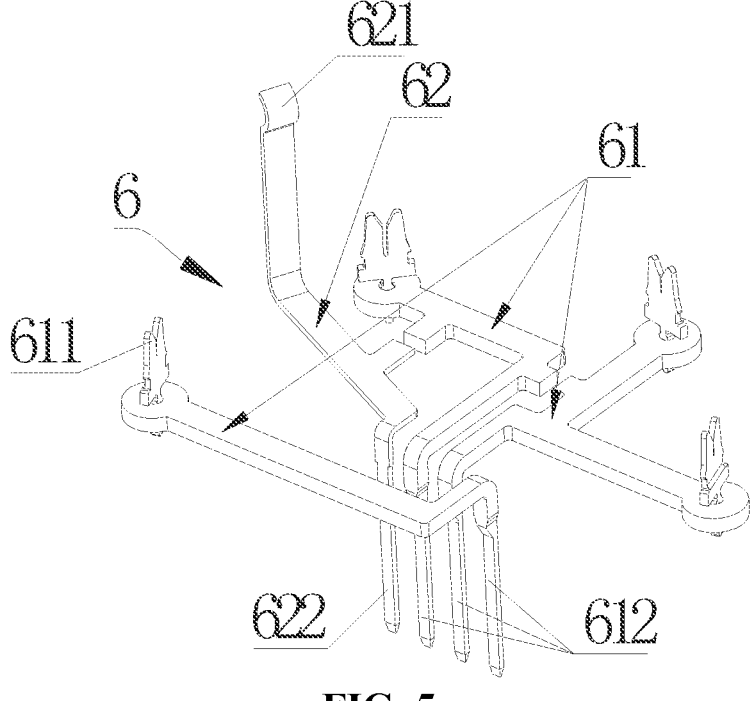
FIG. 5 is a schematic three-dimensional structure diagram of the conductive member in FIG. 4.

Referring to FIG. 1, FIG. 1 is a schematic structural diagram of the first embodiment of the fluid driving apparatus in the present application, FIG. 4 is a schematic structural diagram of the first embodiment in which the limiting member and the conductive member in FIG. 1 are assembled together, the first embodiment of the fluid driving apparatus is described in detail below.

Figures 2, 3:
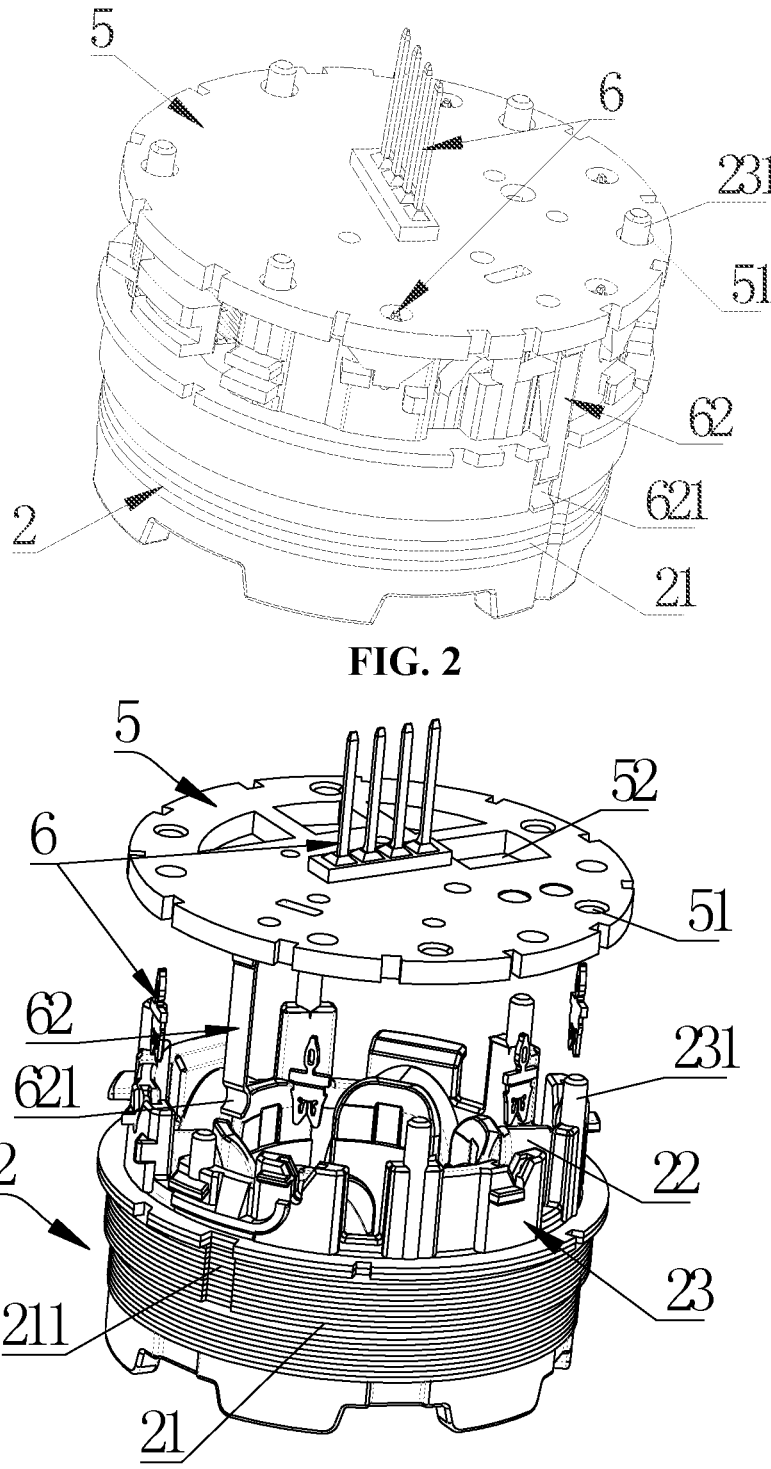
FIG. 2 is a schematic three-dimensional structure diagram of a stator assembly, a limiting member and a conductive member assembled together in FIG. 1.
FIG. 3 is a schematic diagram of an exploded structure of a first embodiment of the stator assembly, the limiting member and the conductive member in FIG. 1.

Referring to FIG. 2 and FIG. 3, the insulating frame 23 includes at least two positioning posts 231, and the positioning posts 231 are distributed along a circumferential direction of the insulating frame 23; the limiting member 5 includes positioning hole 51, and the number of the positioning hole 51 is at least the same as the number of the positioning posts 231; specifically, in this embodiment, the number of the positioning holes 51 and the number of the positioning posts 231 are respectively five, each positioning post 231 passes through the corresponding positioning hole 51 respectively, each positioning post 231 is matched with the corresponding positioning hole 51, so that the limiting member 5 is limited in the circumferential direction, specifically, in this embodiment, each positioning post 231 is in clearance fit with the corresponding positioning hole 51; referring to FIG. 2 and FIG. 3, one end of the positioning post 231 extends out of the positioning hole 51, in this embodiment, the limiting member 5 is fixedly connected with the stator assembly 2 by hot riveting the protruding end of the positioning post 231. Referring to FIG. 2 and FIG. 3, the limiting member 5 further includes at least one hollow portion 52 penetrating through the upper and lower surfaces of the limiting member 5, the provision of the hollow portion 52 is beneficial to reduce the weight of the limiting member 5 on one hand, and to reduce the material used for the limiting member 5 in the injection molding process on the other hand, thereby facilitating reducing the cost.

Referring to FIG. 2 to FIG. 5, the conductive member 6 includes a first connecting end and a second connecting end, the first connecting end is electrically connected to the stator assembly 2, and the second connecting end can be used as a pin end when electrically connected to an interface of an external power source, and the stator assembly 2 can be electrically connected to the interface of the external power source through the conductive member 6; this is beneficial to lead out the energized end of the stator assembly 2, so that the drawn energized end can be used as the pin of the interface of the external power source; as the conductive member 6 is limited by the limiting member 5, the assembly is convenient, which is beneficial to simplify the process; the above is introduced in detail below.

Referring to FIG. 2 to FIG. 5, in this embodiment, the fluid driving apparatus 100 includes the first conductive member 61, the first connecting end 611 of the first conductive member 61 is electrically connected to the winding 22 in the stator assembly 2, the second connecting end 612 of the first conductive member 61 serves as the power pin end of the external interface, specifically, in this embodiment, the fluid driving apparatus 100 includes three first conductive members 61, the second connecting ends 612 of the three first conductive members 61 are respectively used as the U-phase pin end, the V-phase pin end and the W-phase pin end of the external interface and are arranged side by side; of course, the second connecting ends 612 of the three first conductive members 61 can also be arranged in rows, and the specific arrangement position can be adaptively designed according to the interface of the external power source; in addition, in this embodiment, the windings 22 in the stator assembly 2 correspond to three-phase windings, and the number of the first conductive members 61 is the same as the number of phases of the windings. Of course, when the winding 22 in the stator assembly 2 is a single-phase winding, the number of the first conductive members 61 may also be two; referring to FIG. 2 and FIG. 4, the fluid driving apparatus 100 further includes a second conductive member 62, the first connecting end 621 of the second conductive member 62 is in conductive contact with the stator iron core 21 in the stator assembly 2, the second connecting end 622 of the second conductive member 62 is used as the grounding pin end of the interface of external power source, which is beneficial to lead out the static electricity on the surface of the stator iron core 21, and further beneficial to prevent the static electricity from affecting the performance of the fluid driving apparatus; specifically, referring to FIG. 2 and FIG. 3, in this embodiment, the stator iron core 21 includes a concave portion 211, the concave portion 211 is recessed from the outer peripheral surface of the stator iron core 21, the first connecting end 621 of the second conductive member 62 protrudes into the cavity of the concave portion 211 and is in contact with the stator iron core at the side wall of the concave portion 211. Through the above description, in this embodiment, the fluid driving apparatus 100 includes a first conductive member and a second conductive member, the first conductive member is used as the power pin end of the interface of external power source, and the second conductive member is used as the ground pin end of the interface of external power source; of course, the fluid driving apparatus may also only include the first conductive member, and the first conductive member only needs to be the power pin end of the interface of external power source; that is, there is no need to separately set the second conductive member as the ground pin end of the interface of external power source; the following takes the example of the fluid driving apparatus including the first conductive member and the second conductive member for detailed description.

Figures 6, 7:
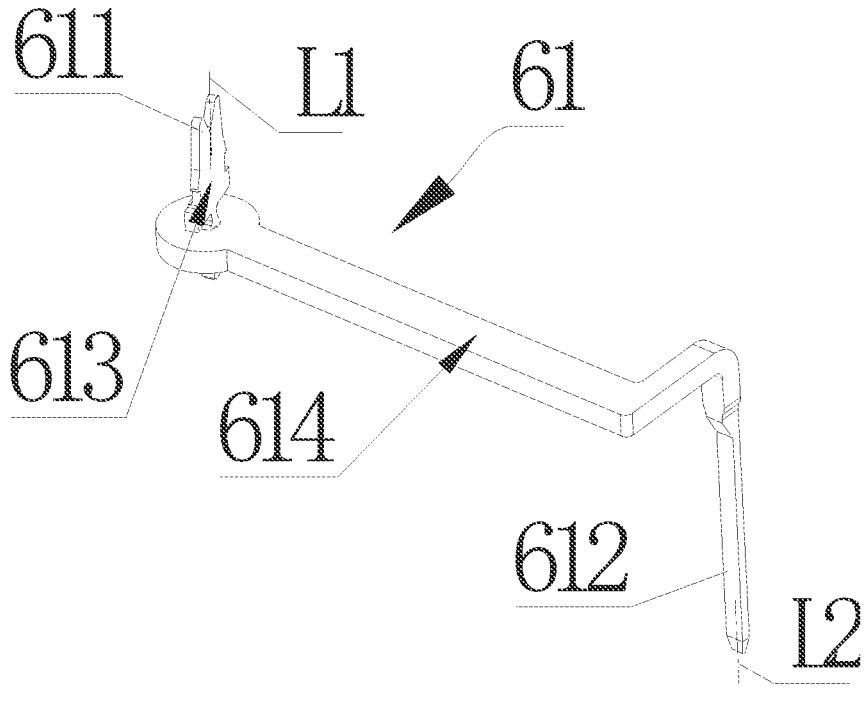
FIG. 6 is a schematic three-dimensional structure diagram of a first conductive member in FIG. 5.
FIG. 7 is a schematic three-dimensional structure diagram of a second part in FIG. 6.

Referring to FIG. 6, the first conductive member 61 includes a first part 613 and a second part 614, in this embodiment, the first part 613 and the second part 614 are arranged separately, the "separate arrangement" here means that the first part 613 and the second part 614 are processed separately, which are two independent parts. Of course, the first part 613 and the second part 614 may also be an integral structure. For details, please refer to the second embodiment of the first conductive member below, which is not repeated here. Referring to FIG. 6, the first connecting end 611 of the first conductive member 61 is located at the first end of the first part 613, the second connecting end 612 of the first conductive member 61 is located at the first end of the second part 614, the central axis L1 of the first connecting end 611 of the first conductive member 61 and the central axis L2 of the second connecting end 612 of the first conductive member 61 are parallel to each other, and the central axis L1 of the first connecting end 611 of the first conductive member 61 and the central axis L2 of the second connecting end 612 of the first conductive member 61 both extend along the axial direction of the fluid driving apparatus; specifically, in this embodiment, the central axis L1 of the first connecting end 611 of the first conductive member 61 and the central axis L2 of the second connecting end 612 of the first conductive member 61 are both parallel to the central axis of the fluid driving apparatus; here, "parallelism" means theoretical parallelism, but there may be errors in the actual manufacturing and assembly process. All parallelism errors caused by manufacturing and assembly are within the scope of protection of the present application.

Referring to FIG. 7, the second end of the second part 614 has a connecting hole 6140, and the connecting hole 6140 is a through hole, referring in combination with FIG. 6, the second end of the first part 613 extends into the connecting hole 6140 and is tightly fitted with the second part 614, which enables the first part 613 and the second part 614 to be in contact with each other, thereby enabling electrical conduction between the first part 613 and the second part 614. Here, tight fit means.

Figures 8, 9:
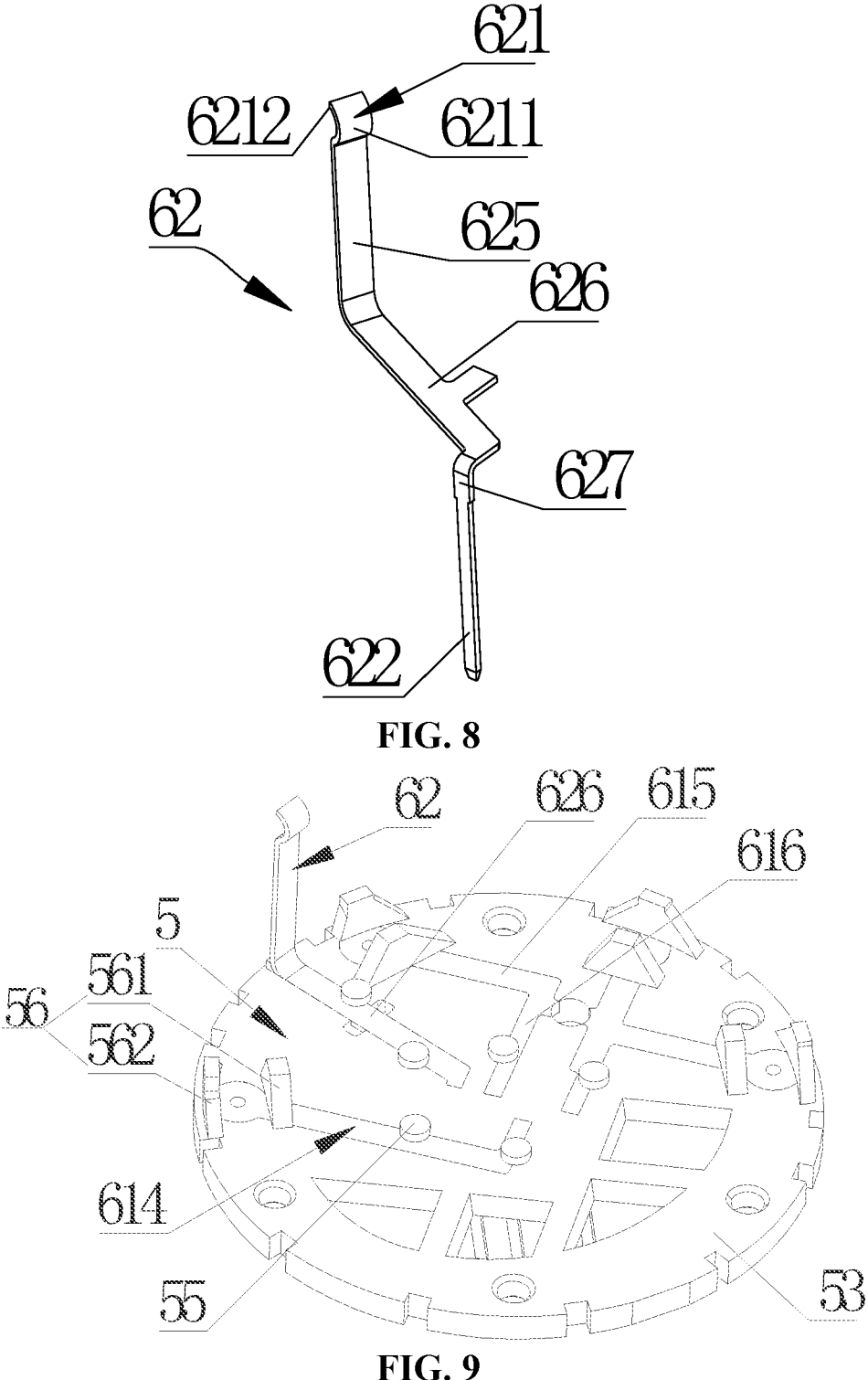
FIG. 8 is a schematic three-dimensional structure diagram of a second conductive member in FIG. 5.
FIG. 9 is a schematic three-dimensional structure diagram in one direction in which the limiting member and the second part are assembled together in FIG. 5.

Referring to FIG. 6 and FIG. 7, in this embodiment, the molding process of the second part 614 includes a bending process, and by setting the bending process, the second connecting end 612 of the first conductive member 61 can be set in a preset direction; specifically, in this embodiment, the second part 614 includes two bends. Of course, according to the actual position of the external plug-in portion, the second part can be designed to be bent once or for multiple times. Specifically, referring to FIG. 7, the second part 614 further includes a first straight section 615, a second straight section 616 and a first vertical section 617, one end of the second straight section 616 is connected to the first straight section 615 through an arc transition or direct connection, another end of the second straight section 616 is connected to the first vertical section 617 through an arc transition or direct connection, the second connecting end 612 is located at the end of the first vertical section 617 along the extension direction; referring to FIG. 6 and FIG. 7, the first straight section 615 and the second straight section 616 are located in the same plane, and in this embodiment, the first straight section 615 and the second straight section 616 are vertically arranged, the first vertical section 617 is perpendicular to the second straight section 616, the first vertical section 617 is perpendicular to the first straight section 615, the "vertical" mentioned above is theoretical vertical, but there may be errors in the actual manufacturing and assembly process. All verticality errors caused by manufacturing and assembly are within the scope of protection of the present application; in this embodiment, the first straight section 615 is perpendicular to the second straight section 616, the first vertical section 617 is perpendicular to the first straight section 615, of course, the first straight section 615 and the second straight section 616 may also be arranged at other angles, the first vertical section 617 and the first straight section 615 may also be arranged at other angles; in addition, referring to FIG. 7, in this embodiment, a thickness of the second connecting end 612 is smaller than a thickness of the first vertical section 617, of course, the thickness of the second connecting end 612 may also be equal to or greater than the thickness of the first vertical section 617, and the specific thickness parameter can be adaptively designed according to the interface of the external power source. The two bending processes of the second part 614 is described below. The first bending is: the bending between the first straight section 615 and the second straight section 616; the second bending is: the bending between the second straight section 616 and the first vertical section 617; the first bending and the second bending here do not indicate the order of bending. Referring to FIG. 8, in this embodiment, the second conductive member 62 is an integral structure, and the "integral structure" here means that the second conductive member 62 is processed into a component; of course, the second conductive member 62 can also be provided in a separate body, that is, the second conductive member 62 can be assembled into one body by two or more components; referring to FIG. 8, the first end of the second conductive member 62 is the first connecting end 621 of the second conductive member 62, and the second end of the second conductive member 62 is the second connecting end 622 of the second conductive member 62, the first connecting end 621 of the second conductive member 62 has a convex shape. Referring to FIG. 2, the first connecting end 621 is protruded in the direction close to the stator iron core; referring to FIG. 1, FIG. 2 and FIG. 8, the protrusion of the first connecting end 621 of the second conductive member 62 has an outer wall 6211 and an inner wall 6212, the outer wall 6211 is in contact with the stator iron core 21, the end of the inner wall 6212 is in contact with the inner wall of the cavity of the first housing 7 in FIG. 1, the inner wall of the cavity of the first housing 7 exerts a force on the first connecting end 621 of the second conductive member 62, so that the first connecting end 621 of the second conductive member 62 can be in contact with the stator iron core 21, thereby improving the reliability of the contact between the first connecting end 621 of the second conductive member 62 and the stator iron core 21; in this embodiment, the first connecting end 621 of the second conductive member 62 is convex, of course, the first connecting end 621 of the second conductive member 62 may also be bent.

Referring to FIG. 8, similarly, the molding process of the second conductive member 62 also includes a bending process, and by setting the bending process, the first connecting end 621 of the second conductive member 62 can be set in a preset direction; specifically, in this embodiment, the second part 614 includes three bends. Of course, according to the actual position of the external plug-in portion, the second part can be designed to be bent once or twice or multiple times; specifically, referring to FIG. 8, the second conductive member 62 includes a first section 625, a second section 626 and a third section 627, the first section 625 is closer to the first connecting end 621 of the second conductive member than the second section 626, the first connecting end 621 of the second conductive member is located at the end of the first section 625 along the extension direction, the second connecting end 622 of the second conductive member 62 is located at the end of the third section 627 along the extension direction, one end of the second section 626 is connected with the first section 625 through arc transition or direct connection, another end of the second section 626 is connected with the third section 627 through arc transition or direct connection; the first section 625 and the second section 626 are arranged at an angle, and the third section 627 and the second section 626 are arranged at an angle; the bending process of the second part is described below. The first bending: the bending between the first section 625 and the second section 626; the second bending: the bending between the second section 626 and the third section 627; the third bending: the bending of the first connecting end 621 of the second conductive member; the first bending, the second bending and the third bending here do not indicate the order of bending.

Figures 10, 11:
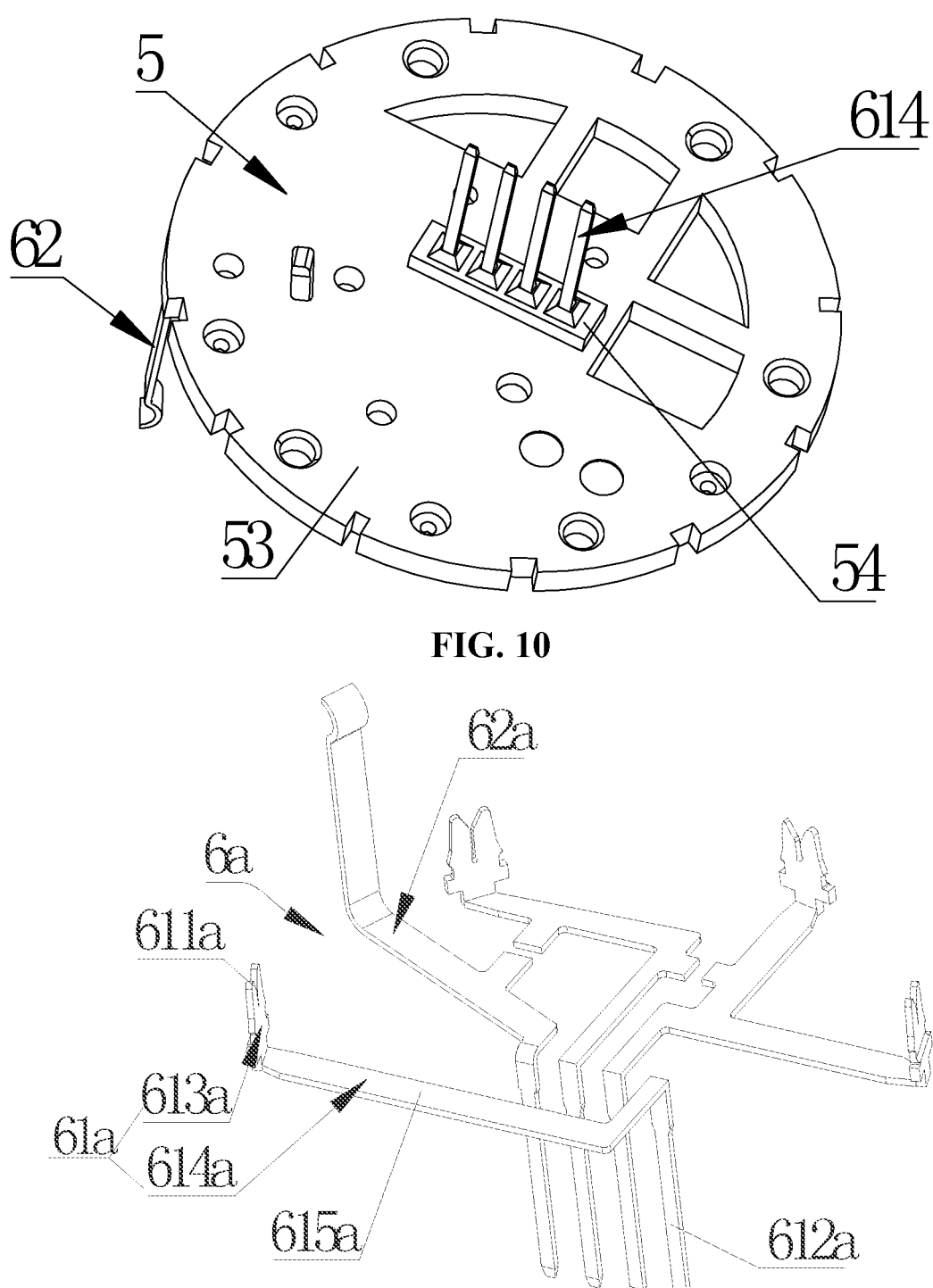
FIG. 10 is a schematic three-dimensional structure diagram in another direction in which the limiting member and the second part are assembled together in FIG. 5.
FIG. 11 is a schematic structural diagram of the second embodiment of the conductive member in FIG. 1.

Referring to FIG. 9 and FIG. 10, in this embodiment, a limiting member 5 is formed by injection molding with the second part 614 and the second conductive member 62 as inserts; specifically, referring to FIG. 4, FIG. 9 and FIG. 10, the limiting member 5 includes a body portion 53, in this embodiment, the first connecting end 611 of the first conductive member 61 is located at one side of the body portion 53, the second connecting end 612 of the first conductive member 61 is located at another side of the body portion 53, the first connecting end 611 and the second connecting end 612 of the first conductive member 61 are located at both sides of the body portion 53. Specifically, in this embodiment, the first connecting end 611 of the first conductive member 61 is located at an upper side of the body portion 53, the second connecting end 612 of the first conductive member 61 is located at a lower side of the body portion 53, of course, the first connecting end 611 and the second connecting end 612 of the first conductive member 61 may also be located on the same side of the body portion 53, the specific relative position relationship between the two connecting ends can be adaptively designed according to the interface position of the external power source; referring to FIG. 4, in this embodiment, the first connecting end 621 of the second conductive member 62 is located at one side of the body portion 53, the second connecting end 622 of the second conductive member 62 is located at another side of the body portion 53, the first connecting end 621 of the second conductive member 62 and the first connecting end 611 of the first conductive member 61 are located on the same side of the body portion 53, the second connecting end 622 of the second conductive member 62 and the second connecting end 612 of the first conductive member 61 are located on the same side of the body portion 53. In this embodiment, the fluid driving apparatus including the first conductive member and the second conductive member is used as an example for introduction. Of course, when the fluid driving apparatus only includes the first conductive member, it is only necessary to use the second part 614 as an insert for injection molding.

Referring to FIG. 10, the limiting member 5 further includes a reinforcement portion 54, the reinforcing portion 54 protrudes from the body portion 53 of the limiting member 5, and a part of the second part 614 is embedded in the reinforcing portion 54 and the body portion 53; in this embodiment, by partially disposing the reinforcing portion 54 on the limiting member 5, the second part 614 can be partially embedded in the reinforcing portion 54 and the body portion 53. On one hand, it is beneficial to increase the connection length between the second part 614 and the limiting member 5, which in turn is beneficial to improve the connection strength between the second part 614 and the limiting member 5; on the other hand, without increasing the overall thickness of the limiting member 5, the reinforcing portion 54 can be provided in the part of the limiting member 5 to improve the connection strength between the second part 614 and the limiting member 5. In this way, it is beneficial to relatively reduce the weight of the limiting member 5, thereby further saving cost; of course, if the cost factor is not considered, the connection strength between the second part 614 and the limiting member 5 may also be improved by increasing the overall thickness of the limiting member 5.

Referring to FIG. 7 to FIG. 10, the first straight section 615, the second straight section 616 of the first conductive member 61 and the second section 626 of the second conductive member 62 are in contact with the body portion 53 of the limiting member 5 and fit together, the limiting member 5 further includes at least one second protrusion 55, and the second protrusion 55 protrudes from the surface of the body portion 53; in this embodiment, the limiting member 5 includes multiple second protrusions 55, and a first root of the second protrusions 55 is connected to the body portion 53, a second root of at least one of the second protrusions 55 is pressed against the first straight section 615 of the first conductive member 61, a second root of at least one protrusion is pressed against the second straight section 616, the second root of the at least one protrusion is pressed against the second section 626 of the second conductive member, which is beneficial to prevent the first straight section 615, the second straight section 616 of the first conductive member 61 and the second section 626 of the second conductive member 62 from being separated from the body portion 53, the first straight section 615, the second straight section 616 of the first conductive member 61 and the second section 626 of the second conductive member 62 are further limited in the axial direction of the fluid driving apparatus; in this embodiment, the second protrusion 55 is formed by injection molding, and the second protrusion 55 is non-conductive, and when the fluid driving apparatus works, it is beneficial to prevent the current passing through the first conductive member 61 and the second conductive member 62 from leaking through the second protrusion 55.

Referring to FIG. 9, in this embodiment, the first straight section 615, the second straight section 616 of the first conductive member 61 and the second section 626 of the second conductive member 62 are embedded in the body portion 53, and, the upper surfaces of the first straight section 615 and the second straight section 616 of the first conductive member 61 and the upper surface of the second section 626 of the second conductive member 62 are flush with the upper surface of the body portion 53, and the upper surfaces of the conductive members are at least partially exposed, in the injection molding process, the exposed parts of the upper surfaces of the first straight section 615 and the second straight section 616 of the first conductive member 61 and the upper surface of the second section 626 of the second conductive member 62 can be used as positioning reference surfaces.

Referring to FIG. 4 and FIG. 9, the limiting member 5 further includes multiple first protrusions 56, and the first protrusion 56 protrudes from the upper surface of the body portion 53; referring to FIG. 4, the first connecting end 611 includes a wire slot 6111, referring to FIG. 4, for the convenience of description, the enameled wire is schematically drawn through the wire slot; the enameled wire corresponding to the winding 22 of the stator assembly 2 in FIG. 1 can pass through the wire slot 6111, the enameled wire 221 located in the wire slot 6111 is in contact with the slot wall corresponding to the wire slot 6111 and is electrically connected; the top surface 563 of the first protrusion 56 is higher than the bottom surface 6112 corresponding to the groove wall of the wire slot 6111, the enameled wire 221 passing through the wire slot 6111 is supported on the top surface 563 of the first protrusion 56, or the enameled wire 221 passing through the wire slot 6111 is higher than the top surface 563 of the first protrusion 56; during the use of the fluid driving apparatus, the falling distance of the enameled wire in the wire slot 6111 can be limited; referring to FIG. 4, in this embodiment, the radial dimension of the bottom of the wire slot 6111 is larger than the radial dimension of the enameled wire 221, if the enameled wire 221 in the wire slot 6111 falls into the cavity at the bottom of the wire slot 6111, it may happen that the enameled wire 221 does not contact the first connecting end 611 and thus cannot achieve conduction; in this embodiment, the second protrusion 56 is provided, which is beneficial to prevent the enameled wire in the wire slot 6111 from falling into the cavity at the bottom of the wire slot 6111, thus improving the reliability of the conduction between the enameled wire 221 and the first connecting end 611. Specifically, referring to FIG. 4 and FIG. 9, in this embodiment, part of the first protrusion 56 is located on one side of the first connecting end 611, part of the first protrusion 56 is located on another side of the first connecting end 611; for convenience of description here, a first protrusion located at one side of the first connecting end 611 is defined as a second main protrusion 561, a first protrusion located at another side of the first connecting end 611 is defined as a second auxiliary protrusion 562, the second main protrusion 561 is arranged in parallel with the second auxiliary protrusion 562; the second main protrusion 561, the first connecting end 611 and the second auxiliary protrusion 562 are distributed along the radial direction of the limiting member 5; in this way, the two sides of the first connecting end 611 are respectively provided with protrusions, so that both ends of the enameled wire passing through the wire slot 6111 can be supported on the top surface of the corresponding protrusions, or both ends of the enameled wire passing through the wire slot 6111 are higher than the top surface of the corresponding protrusion; in this embodiment, a protrusion is arranged on both sides of the first connecting end 611, of course, it is also possible to provide at least one protrusion on only one side of the first connecting end 611. Referring to FIG. 11, FIG. 11 is a schematic structural diagram of the second embodiment of the conductive member in FIG. 1, FIG. 12 is a schematic structural diagram of the second embodiment in which the conductive member and the limiting member in FIG. 1 are assembled together; the second embodiment of the conductive member is described in detail below.

Referring to FIG. 11, in this embodiment, the first conductive member 61a includes a first part 613a and a second part 614a, the first part 613a and the second part 614a are of an integrated structure, and the "integrated structure" here means that the first part 613a and the second part 614a are processed or manufactured into one component; the first part 613a is perpendicular to the first straight section 615a of the second part 614a, and the first part 613a is located at one end of the first straight section 615a of the second part 614a; in this embodiment, the structure of the second conductive member 62a may refer to the second conductive member in the first embodiment, which is not repeated here.

Figures 12, 13:
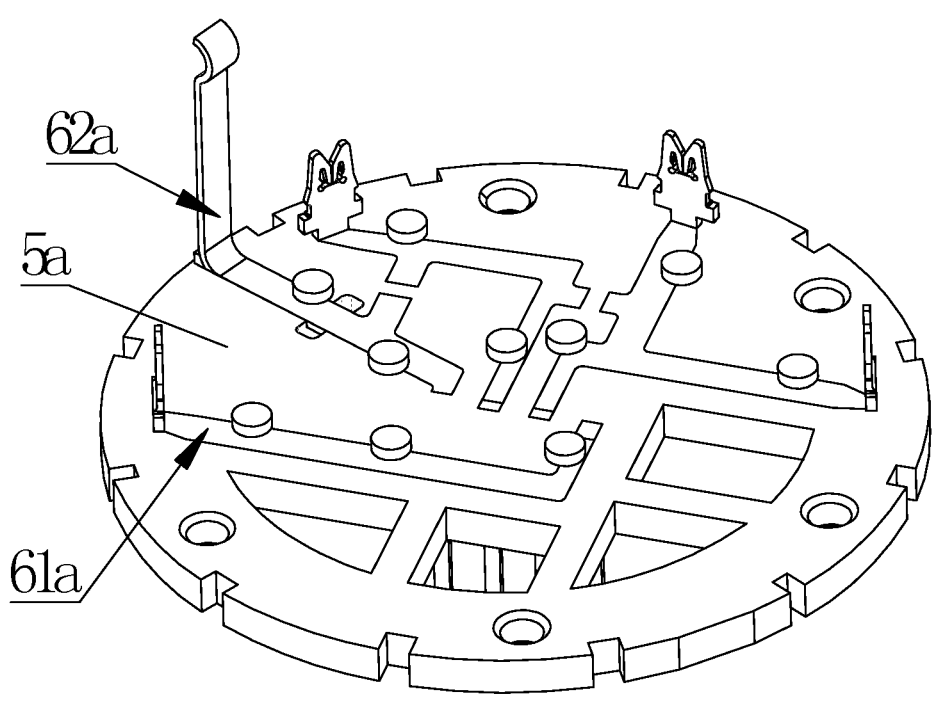
FIG. 12 is a schematic structural diagram in one direction of the second embodiment in which the conductive member and the limiting member in FIG. 1 are assembled together.
FIG. 13 is a schematic structural diagram in another direction of the second embodiment in which the conductive member and the limiting member in FIG. 1 are assembled together.

Referring to FIG. 12 to FIG. 13, in this embodiment, the first conductive member 61a and the second conductive member 62a are used as inserts to form the limiting member 5a by injection molding.

Compared with the first embodiment of the conductive member, in this embodiment, the first part 613a and the second part 614a are of an integral structure, the first conductive member 61a and the second conductive member 62a are used as inserts to form the limiting member 5a by injection molding, and it is only necessary to assemble the formed limiting member 5a with the stator assembly, the assembly steps can be relatively reduced, thus being beneficial to simplifying the assembly process and further improving the assembly efficiency of the fluid driving apparatus; in this embodiment, other structural features of the limiting member 5a may refer to the first embodiment of the limiting member, which is not repeated here.

Figure 14:
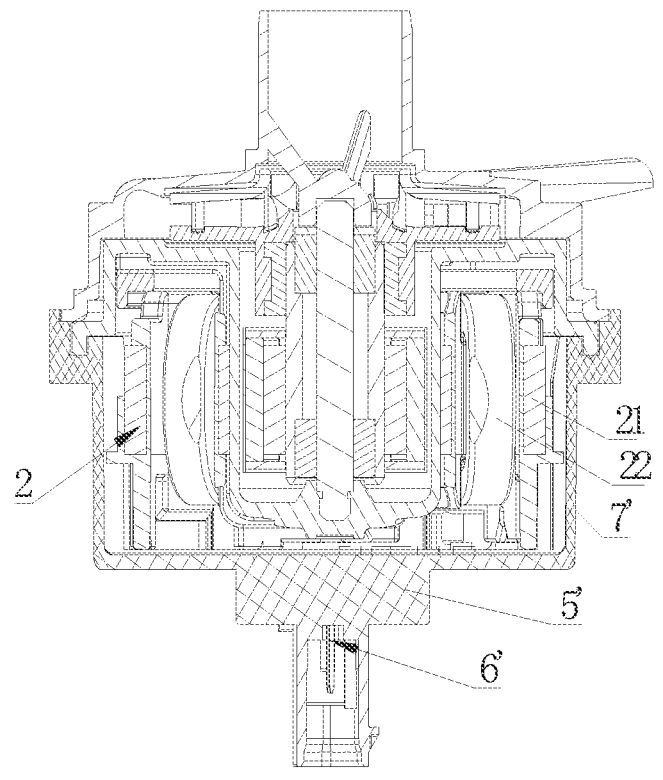
FIG. 14 is a schematic cross-sectional diagram of a second embodiment of a fluid driving apparatus of the present application.
Figure 15:
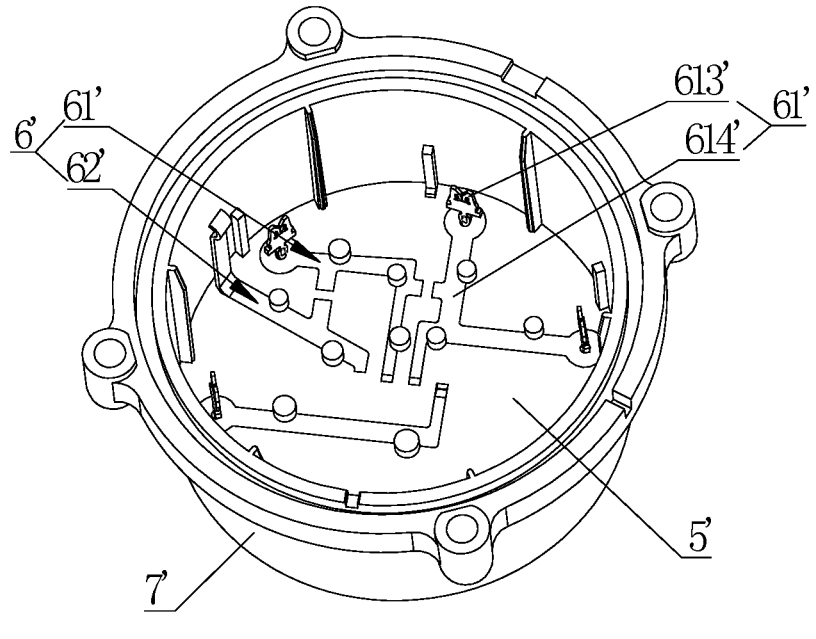
FIG. 15 is a schematic structural diagram of the first embodiment in which a first housing, the limiting member and the conductive member in FIG. 14 are assembled together.

Referring to FIG. 14, FIG. 14 is a schematic structural diagram of the second embodiment of the fluid driving apparatus in the present application, FIG. 15 is a schematic structural diagram of the first embodiment in which a first housing, the limiting member and the conductive member in FIG. 14 are assembled together; the second embodiment of the fluid driving apparatus is described in detail below.

Figures 16, 17:
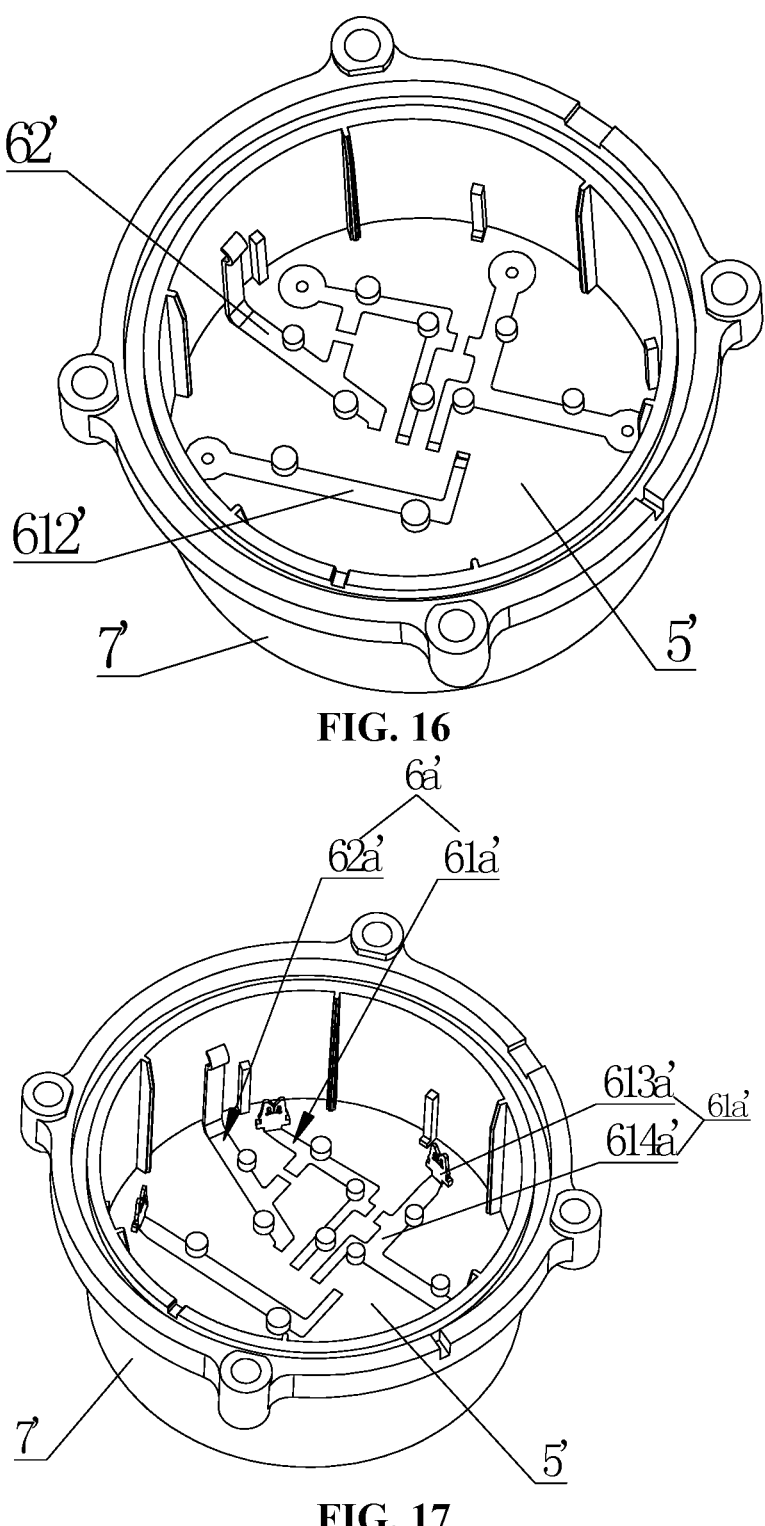
FIG. 16 is a schematic structural diagram of the first embodiment in which the first housing, the limiting member and the second part in FIG. 15 are assembled together.
FIG. 17 is a schematic structural diagram of the second embodiment in which the first housing, the limiting member and the conductive member in FIG. 14 are assembled together.

Referring to FIG. 14 to FIG. 16, in this embodiment, the limiting member 5' and the first housing 7' are in an integrated structure; referring to FIG. 14 to FIG. 16, the conductive member 6' includes a first conductive member 61' and a second conductive member 62', one end of the first conductive member 61' is electrically connected with the winding 22 in the stator assembly 2, and another end of the first conductive member 61' serves as a power source pin terminal of an external interface; one end of the second conductive member 62' is in contact with the stator iron core 21 in the stator assembly 2, and another end of the second conductive member 62' serves as the grounding pin terminal of the external interface. The provision of the second conductive member is conducive to conducting the static electricity on the surface of the stator iron core 21, and further helps to prevent the static electricity from affecting the performance of the fluid driving apparatus.

Referring to FIG. 15 and FIG. 16, the first conductive member 61' includes a first part 613' and a second part 614', the first part 613' and the second part 614' are separate structures, in this embodiment, the second part 614' and the second conductive member 62' are used as inserts to form the limiting member 5' by injection molding; regarding the structure of the first conductive member 61', reference may be made to the structure of the first conductive member in the first embodiment of the fluid driving apparatus above, which is not repeated here.

Compared with the first embodiment of the fluid driving apparatus, in this embodiment, the limiting member 5' and the first housing 7' are in an integrated structure, and there is no need to separately set the limiting member 5', so that the structure of the fluid driving apparatus is simplified and the assembly is simpler; for other structural features of the limiting member 5' and the conductive member 6' in this embodiment, reference may be made to the first embodiment of the conductive member and the limiting member in the first embodiment of the fluid driving apparatus, and is not repeated here.

Referring to FIG. 17, FIG. 17 is a schematic structural diagram of the second embodiment in which the first housing, the limiting member and the conductive member in FIG. 14 are assembled together; the second embodiment in which the first housing, the limiting member and the conductive member are assembled together in FIG. 14 is described in detail below.

Figure 18:
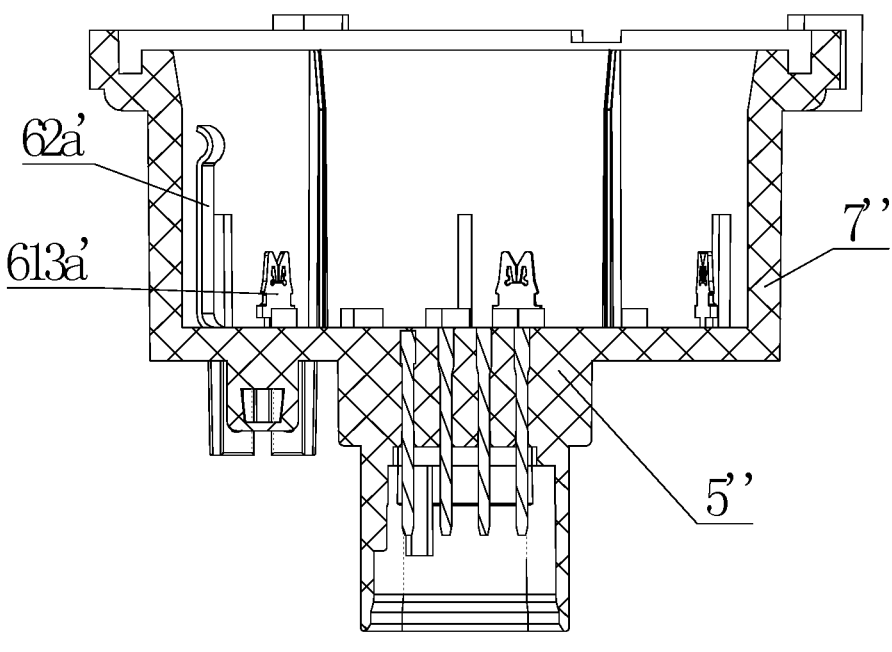
FIG. 18 is a schematic cross-sectional diagram of the first housing, the limiting member and the conductive member in FIG. 17 assembled together.

Referring to FIG. 17 and FIG. 18, in this embodiment, the limiting member 5' is formed by injection molding with the conductive member 6a' as the insert, and in this embodiment, the limiting member 5' and the first housing 7' are in an integrated structure; referring to FIG. 17 to FIG. 18, the conductive member 6a' includes a first conductive member 61a' and a second conductive member 62a', the first conductive member 61a' includes a first part 613a' and a second part 614a', the first part 613a' and the second part 614a' are of an integral structure, and the "integrated structure" here means that the first part 613a' and the second part 614a' are processed or manufactured into one component.

Compared with the first embodiment of the fluid driving apparatus, in this embodiment, the limiting member 5' and the first housing 7' are in an integrated structure, and there is no need to separately set the limiting member 5', so that the structure of the fluid driving apparatus is simplified and the assembly is simpler; for other structural features of the limiting member 5' and the conductive member 6' in this embodiment, reference may be made to the second embodiment of the conductive member and the limiting member in the first embodiment of the fluid driving apparatus, which is not repeated herein.

Figure 19:
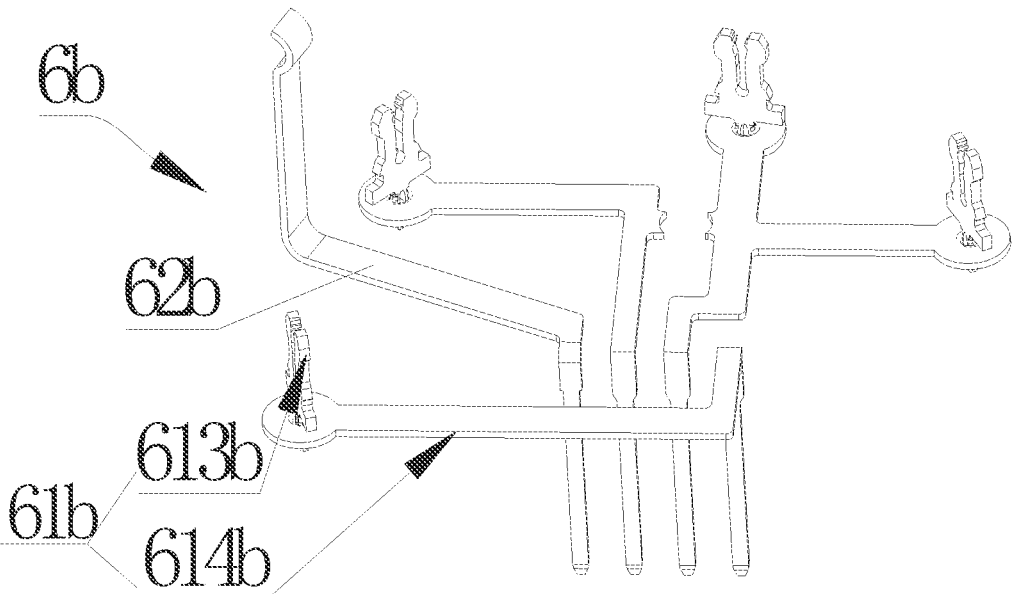
FIG. 19 is a schematic three-dimensional structure diagram of a third embodiment of the conductive member in FIG. 1.

Referring to FIG. 19, FIG. 19 is a schematic three-dimensional structure diagram of a third embodiment of the conductive member in FIG. 1, the third embodiment of the conductive member is described in detail below.

Figure 20:
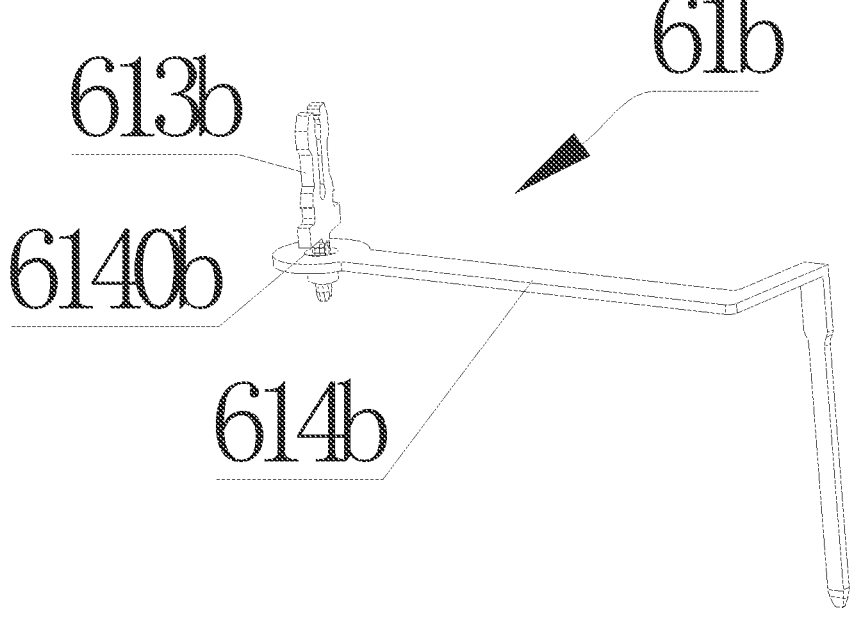
FIG. 20 is a schematic three-dimensional structure diagram of the first conductive member in FIG. 19.

Referring to FIG. 19 and FIG. 20, the conductive member 6b includes a first conductive member 61b and a second conductive member 62b, in this embodiment, the first conductive member 61b includes a first part 613b and a second part 614b, the first part 613b and the second part 614b are separate structures, the "separate structure" here means that the first part 613b and the second part 614b are respectively processed into two independent components; in this embodiment, the structure of the second conductive member 62b may refer to the second conductive member in the first embodiment, which is not repeated here.

Figure 21:
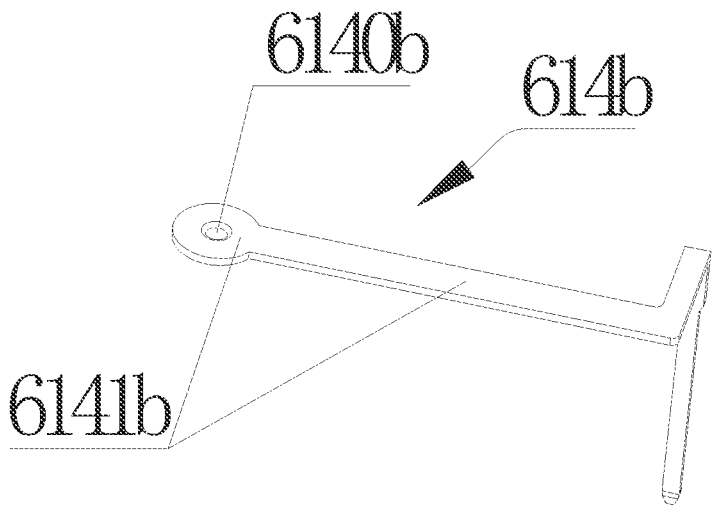
FIG. 21 is a schematic three-dimensional structure diagram of a first part in FIG. 20 in one direction.
Figure 22:
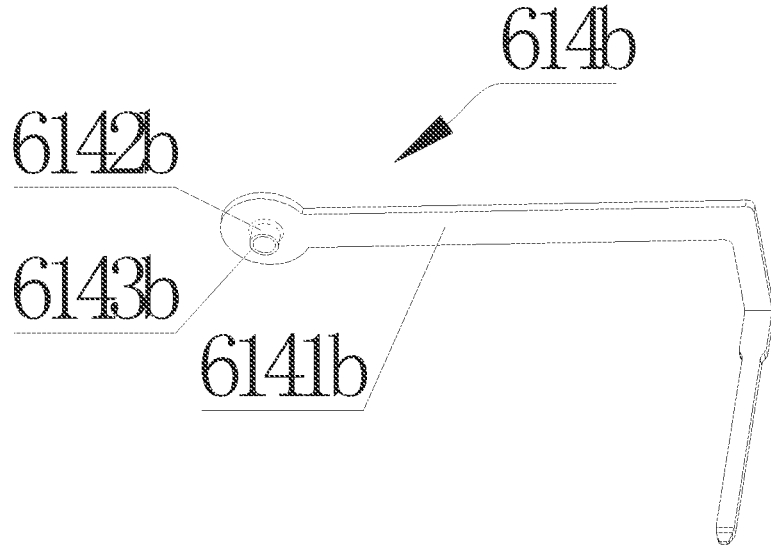
FIG. 22 is a schematic three-dimensional structure diagram of the first part in FIG. 20 in another direction.

Referring to FIG. 21 to FIG. 22, in this embodiment, the second part 614b has a connecting hole 6140b, and the connecting hole 6140b is a through hole, referring in combination with FIG. 20, the second end of the first part 613b extends into the connecting hole 6140b and is tightly fitted with the connecting hole 6140b, which enables the first part 613b and the second part 614b to be in contact with each other, thereby enabling electrical conduction between the first part 613b and the second part 614b. The tight fit here refers to the tight connection between the two through interference fit or transition fit.

Referring to FIG. 21 and FIG. 22, in this embodiment, the second part 614b includes a main body portion 6141b and a protrusion 6142b, the protrusion 6142b protrudes from the lower surface of the main body portion 6141b around the connecting hole 6140b, along the thickness direction of the second part 614b, the connecting hole 6140b penetrates the upper surface of the main body portion 6141b and the lower surface 6143b of the protrusion 6142b; in this embodiment, the thickness of the main body portion 6141b is less than or equal to 1.5 mm, and the wall thickness of the protrusion 6142b is less than or equal to 0.5 mm; in this embodiment, the protrusion 6142b is formed by flanging the connecting hole, before the flanging process operation, the diameter of the connecting hole 6140b is smaller than the actual required diameter, and through the flanging process, the diameter of the connecting hole is enlarged and a protrusion is formed; in this way, without increasing the thickness of the main body portion, the flanging process is beneficial to increase the height of the connecting hole, which in turn is beneficial to increase the matching height of the first part 613b and the connecting hole 6140b; on the other hand, by increasing the extension height of the connecting hole 6140b through the flanging process, the thickness of the main body portion 6141b can be reduced, which is beneficial to reduce the production cost of the second part 614b.

It should be noted that, the above embodiments are only intended to illustrate the present disclosure and not to limit the technical solutions described in the present disclosure. Although the present specification has been described in detail with reference to the embodiments described above, it should be understood by those skilled in the art that, various modifications and equivalents can be made to the technical solutions of the present disclosure without departing from the spirit and scope of the present disclosure, all of which should be contained within the scope of the claims of the present disclosure.

What is claimed is:

1. A fluid driving apparatus, comprising a stator assembly, a limiting member and a conductive member, wherein the conductive member and the limiting member are arranged in a limited or fixed manner, and the conductive member comprises a first connecting end and a second connecting end, and the first connecting end is electrically connected to the stator assembly, and the second connecting end is configured to be used as a pin end when electrically connected to an external power source of the fluid driving apparatus, and the conductive member allows the stator assembly to be electrically connected with the external power source of the fluid driving apparatus; the conductive member is partially embedded in the limiting member, and the limiting member is an injection molded member, wherein the fluid driving apparatus has an inner cavity, and the stator assembly and the limiting member are located in the inner cavity, and the stator assembly and the limiting member are arranged along an axial direction of the fluid driving apparatus, and the stator assembly is fixedly connected with the limiting member, wherein the limiting member comprises a body portion, the first connecting end is located on one side of the body portion, the second connecting end is located on one side of the body portion, and the first connecting end and the second connecting end are located on both sides of the body portion, wherein the limiting member further comprises at least one first protrusion, the first protrusion protrudes from the upper surface of the body portion, and the first protrusion is located on one side of the first connecting end; the first connecting end comprises a wire slot, and an enameled wire corresponding to the winding of the stator assembly passes through the wire slot, the enameled wire located in the wire slot is in contact with the slot wall corresponding to the wire slot and is electrically connected; the first protrusion and the first connecting end are distributed along a radial direction of the limiting member, and a top surface of the first protrusion is higher than a bottom surface corresponding to a slot wall of the wire slot, the enameled wire passing through the wire slot is supported on the top surface of the first protrusion, or the enameled wire passing through the wire slot is higher than the top surface of the first protrusion.

2. The fluid driving apparatus according to claim 1, wherein the fluid driving apparatus further comprises a first housing, and the limiting member and the first housing are of an integral structure.

3. The fluid driving apparatus according to claim 1, wherein the first connecting end is located on an upper side of the body portion, and the second connecting end is located at an lower side of the body portion; an insulating frame of the stator assembly comprises at least two positioning posts, and the positioning posts are distributed along a circumferential direction of the insulating frame of the stator assembly; the limiting member comprises at least two positioning holes, and each of the positioning posts respectively passes through the corresponding positioning holes, each of the positioning posts is arranged in cooperation with the corresponding positioning holes, and one end of the positioning posts protrudes out of the positioning holes, by hot riveting the protruding end of the positioning post, the limiting member is fixedly connected with the stator assembly.

4. The fluid driving apparatus according to claim 3, wherein the limiting member further comprises at least one second protrusion, the second protrusion protrudes from a surface of the body portion, and a first root portion of the second protrusion is connected to the body portion, and a second root portion of the second protrusion is pressed against a part of the surface of the conductive member.

5. The fluid driving apparatus according to claim 1, wherein the conductive member comprises a first conductive member, a first connecting end of the first conductive member is electrically connected to the winding in the stator assembly, and a second connecting end of the first conductive member serves as the power pin end of the external interface.

6. The fluid driving apparatus according to claim 1, wherein the conductive member comprises a first conductive member and a second conductive member, a first connecting end of the first conductive member is electrically connected to the winding in the stator assembly, a second connecting end of the first conductive member is used as the power pin end of the external power source of the fluid driving apparatus; a first connecting end of the second conductive member is in contact with the stator iron core in the stator assembly, and a second connecting end of the second conductive member serves as the ground pin end of the external power source of the fluid driving apparatus.

7. The fluid driving apparatus according to claim 1, wherein the first conductive member comprises a first part and a second part, the first connecting end is located at one end of the first part, and the second connecting end is located at one end of the second part; and a central axis of the first connecting end and a central axis of the second connecting end extend along an axial direction of the fluid driving apparatus.

8. The fluid driving apparatus according to claim 7, wherein the first part and the second part are an integral structure; the limiting member is formed by injection molding with the first conductive member as an insert; the first conductive member comprises a first straight section, a second straight section and a first vertical section, the first straight section and the second straight section are in contact and fit with the main body of the limiting member, one end of the second straight section is connected with one end of the first straight section, and another end of the second straight section is connected with the first vertical section, wherein the first straight section is vertically arranged with the second straight section, and the first vertical section is vertically arranged with the first straight section; the first part is located at the end of the first straight section, the first part is perpendicular to the first straight section, and the second connecting end is located at the end of the extension direction of the first vertical section.

9. The fluid driving apparatus according to claim 6, wherein the first part and the second part are separately arranged; the second part is used as an insert to form the limiting member by injection molding; a second end of the second part has a connecting hole, and a second end of the first part extends into the connecting hole and is tightly fitted with the second part.

10. The fluid driving apparatus according to claim 9, wherein the second part comprises a main body portion and a protrusion, the protrusion is protruded from a lower surface of the main body portion and around the connecting hole, and along a thickness direction of the second part, the connecting hole penetrates an upper surface of the main body portion and a lower surface of the protrusion.

* * * * *